US011041569B2

(12) United States Patent
Krause et al.

(10) Patent No.: US 11,041,569 B2
(45) Date of Patent: Jun. 22, 2021

(54) SYSTEMS AND METHODS FOR FLOATING SEAT PLATE

(71) Applicant: TapcoEnpro, LLC, Channelview, TX (US)

(72) Inventors: Kenneth W. Krause, Sandy, UT (US); Filiberto R. Jimenez, Channelview, TX (US)

(*) Notice: Subject to any disclaimer, the term of this patent is extended or adjusted under 35 U.S.C. 154(b) by 87 days.

(21) Appl. No.: 16/403,039

(22) Filed: May 3, 2019

(65) Prior Publication Data

US 2020/0347942 A1 Nov. 5, 2020

(51) Int. Cl.
| F16K 1/42 | (2006.01) |
| F16K 1/20 | (2006.01) |
| C10B 25/10 | (2006.01) |
| C10B 39/08 | (2006.01) |
| F16K 3/312 | (2006.01) |

(52) U.S. Cl.
CPC .............. *F16K 1/427* (2013.01); *C10B 25/10* (2013.01); *C10B 39/08* (2013.01); *F16K 1/2057* (2013.01); *F16K 3/312* (2013.01)

(58) Field of Classification Search
CPC ........ F16K 1/427; F16K 1/2057; F16K 3/312; F16K 3/20; F16K 3/207; C10B 25/10; C10B 39/08
USPC .................................................. 138/94, 94.3
See application file for complete search history.

(56) References Cited

U.S. PATENT DOCUMENTS

| 4,228,988 A * | 10/1980 | Higashi ................. F16K 3/0227 137/629 |
| 4,513,947 A * | 4/1985 | Amend ..................... F16K 3/20 251/159 |
| 5,370,149 A * | 12/1994 | Clarkson ............... F16K 3/0281 137/375 |
| 6,279,875 B1 * | 8/2001 | Chatufale ............... F16K 3/207 251/171 |
| 8,936,701 B2 * | 1/2015 | Lah ....................... F16K 3/0281 202/242 |
| 10,100,937 B2 * | 10/2018 | Kim ...................... F16K 3/0227 |
| 2005/0034969 A1 * | 2/2005 | Lah .......................... C10B 25/10 202/242 |
| 2020/0141508 A1 * | 5/2020 | Mcguire ................. F16K 5/205 |
| 2020/0300372 A1 * | 9/2020 | Sundararajan ........ F16K 27/044 |

* cited by examiner

*Primary Examiner* — Craig M Schneider
*Assistant Examiner* — David R Deal
(74) *Attorney, Agent, or Firm* — Michael F. Krieger; Kirton McConkie

(57) ABSTRACT

A seat plate which maintains constant contact and load against the gate to keep sealing surfaces protected is disclosed. The seat plate has a dynamic seat function ie live-loaded to follow the gate surface during stroking and high temperature changes. The valve maintains a positive barrier between body steam chamber and process fluid through port. The valve uses an extended seat plates to maintain constant contact with gate in all positions such that all process is captured and not allowed to enter body chamber. The seat plate allows for sufficient axial seat travel upstream and downstream to balance sealing load on both sides of gate. In addition, an axial hard stop on each seat allowing upstream seat to maintain sealing contact with gate.

19 Claims, 12 Drawing Sheets

SYSTEMS AND METHODS FOR FLOATING SEAT PLATE

CROSS-REFERENCE TO RELATED APPLICATIONS

This application does not assert a priority claim.

TECHNICAL FIELD

The present disclosure relates generally to a coke drum deheading valve. More particularly, the disclosure relates to a floating seat plate which articulates to improve the seal between the seat assembly and the gate while also protecting steam ports from process fluid.

BACKGROUND

Petroleum refining operations in which crude oil is processed frequently produce residual oils that have very little value. The value of residual oils can be increased using a process known as delayed coking. Residual oil, when processed in a delayed coker, is heated in a furnace to a temperature sufficient to cause destructive distillation in which a substantial portion of the residual oil is converted, or "cracked" to usable hydrocarbon products and the remainder yields a residual petroleum by-product which is pumped into a large vessel known as a coke drum.

The production of coke is a batch process. Each delayed coker unit usually contains more than one coke drum. In delayed coking, the feed material is typical residuum from vacuum distillation towers and frequently includes other heavy oils. The feed is heated as it is sent to one of the coke drums. The feed arrives at a coke drum with a temperature ranging from 870 to 910° F. Typical drum overhead pressure ranges from 15 to 35 PSIG. Coker feedstock is deposited as a hot liquid slurry in a coke drum. Under these conditions, cracking proceeds and lighter fractions produced flow out of the top of the coke drum and are sent to a fractionation tower where they are separated into vaporous and liquid products. A solid, residuum called coke is also produced and remains within the drum. When a coke drum is filled, residual oil from the furnace is diverted to another coke drum. When a coke drum is filled to the desired capacity, and after feedstock is diverted to another drum, steam is typically introduced into the drum to strip hydrocarbon vapors off of the solid material. The material remaining in the coke drum cools and is quenched. Solid coke forms as the drum cools and must be removed from the drum so that the drum can be reused. While coke is being cooled in one drum and while the cooled solid coke is being extracted from that drum, a second drum is employed to receive the continuous production of coke feedstock as a part of the delayed coker process. The use of multiple coke drums enables the refinery to operate the furnace and fractionating tower continuously. Drum switching frequency ranges from 10 to 24 hours.

In typical coking operations dramatic heat variances are experienced by elements in the coking operation. For example, a coke drum is filled with incoming byproduct at about 900 degrees Fahrenheit and subsequently cooled after being quenched to nearly ambient temperatures. Not surprisingly, this repetitive thermal cycling may create or cause significant problems including stark heat distributing variances throughout various components of a valve system. The heated residual byproduct utilized in coking operations comes into contact with not only the coke drum, but valve and seat components. This heating and subsequent cooling may result in expansion of various elements within a valve system. As previously mentioned the delayed coking process typically comprises at least two vessels so that while one is being filled the other is being purged of material and prepared to receive another batch of byproduct. Thus, during the off cycle, when a vessel is being purged of its contents it will cool and return to a state of equilibrium. It is this cyclical pattern of dispensing hot residual byproduct into a coke drum and subsequently cooling the byproduct that leads to thermal differential and stress within the coke drum, a valve, the valve parts or a line. It is this cyclical loading and unloading and stressing and un-stressing of a coke drum, valve or line that is referred to as thermal cycling. Thermal cycling typically results in the weakening or fatiguing of a coke drum, a valve and its parts which may lead to a reduction in the useful life of the components. Uneven heat distributions or thermal variants existing between various components of the seat system result in decreased longevity of the constitutive elements of the valve body.

Also, because coke is formed using pressure, the deheading valve must form a seal to allow the pressure to build within the coke drum. This seal is generally formed using tight tolerances between the components of the deheading valve such as between the seats and the blind. These tight tolerances, however, increase the force required to slide the blind between the seats to open and close the valve. Also, due to this pressure, it is common to pressurize the internal compartments of the deheading valve such as by providing steam to the internal compartment. If a deheading valve does not provide a good seal, large amounts of steam will escape which increases the total amount of steam required. In many cases, the cost of supplying steam to pressurize the valve can be significant.

Steam is critical to the coking process. Steam provides fluidization of coke particles in the reactor, but it also drives mechanical processes in the valve. Fluidized coke particles, material called process fluids, are dirty and can damage equipment used in the coking process. Traditional valves weld a seat plate to a seat to isolate the process fluid from the valve body. However, the coking process involves wide variations in temperatures and pressures in the reactor. The changing temperatures cause thermal expansion in the equipment, such as the gate. As the gate changes shape due to thermal expansion the seal between the seat and the gate is compromised so that it is unable to contain the high pressures, thus leaks form at the seat/gate interface, due to the increased rigidity. Thus a need exists for a seat plate which isolates the process fluid from the valve body and can still maintain the freedom of movement to articulate with gate deformation caused by thermal expansion.

Accordingly, there exists a need for an extended floating seat plate which articulates to improve the seal between the sea and the gate as the gate thermally expands and contracts during the thermal cycle and which can isolate the valve body from the valve opening to prevent process fluid from entering the valve body.

BRIEF SUMMARY

The general purpose of the systems and methods disclosed herein is to provide an improved seat plate or gate to isolate the seat and the valve body from the process fluids in the coke drum. Specifically, in some embodiments an isolation valve configured to isolate at least one port on a seat plate from a valve opening. In some embodiments the valve comprises a gate having a first side and a second side, a seat with an opening, a receiving portion configured to receive a gate and the gate configured to be selectively inserted into the receiving portion intermediate the seat. In some embodiments there is at least one port formed in the seat, a conical floating seat plate nested concentrically against the seat and between the seat and the opening wherein the seat plate is configured to isolate at least one port formed in the seat from the opening wherein the seat plate is further configured to articulate independent of the seat. In some embodiments there is a bias system configured to bias the seat plate against the seat to isolate the seat from the opening.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
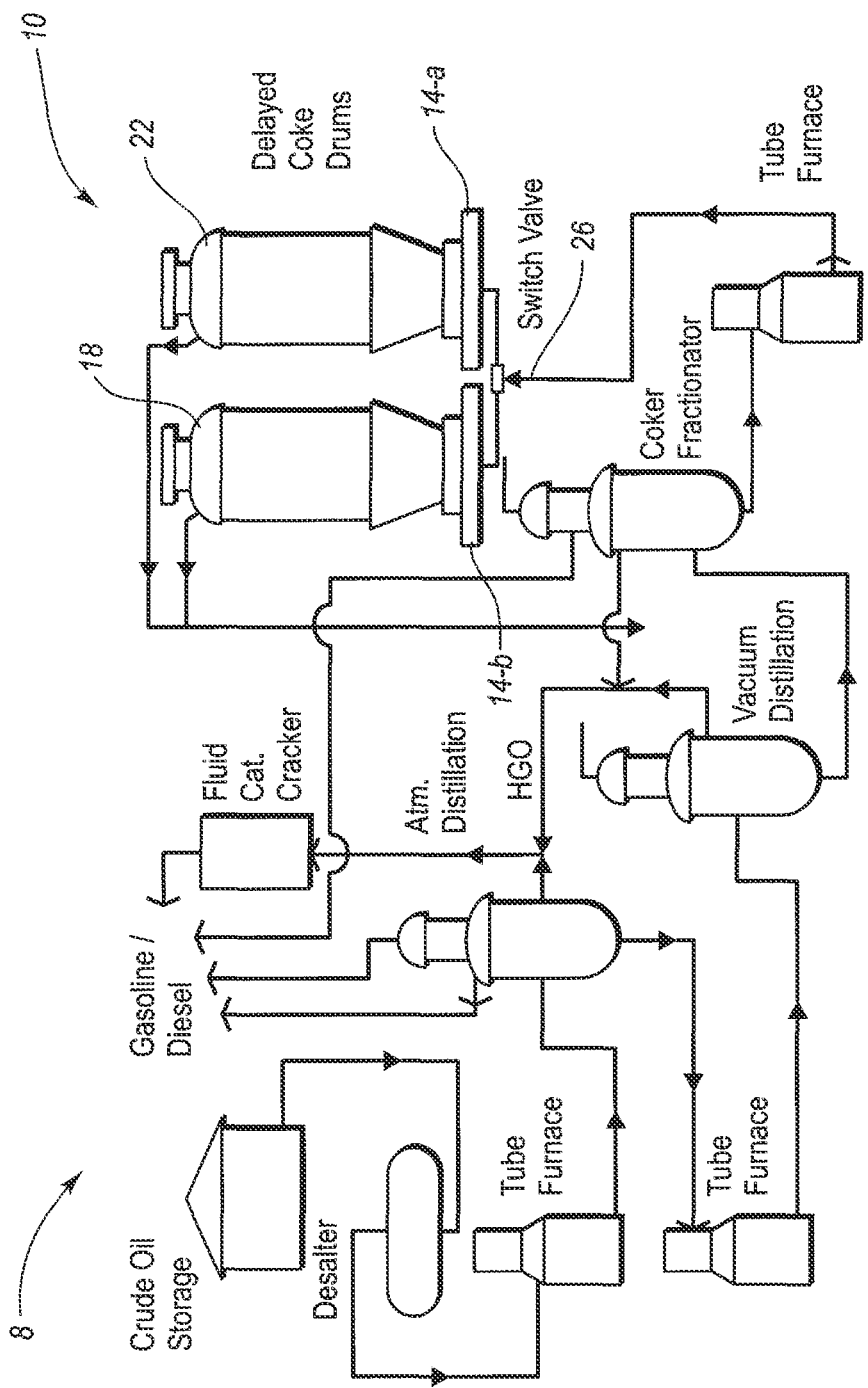
FIG. 1 illustrates a coking process.

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-12 are not intended to limit the scope of the invention, as claimed, but are merely representative of present embodiments of the invention.

In general, the figures disclose a floating seat plate that maintains constant contact and load against the gate to keep the sealing surfaces in the valve protected from process fluids. In some embodiments the sealing surface comprises the interface between the seat 23 and the gate 11. In some embodiments the sealing surface comprises the surface between floating seat plate 24 and gate 11. In some embodiments the floating seat plate comprises a dynamic seat function—Live-loaded with bias systems so the seat plate can follow surface changes in the gate surface as the gate heats and expands during stroking and high temperature changes. In some embodiments the floating seat plate maintains a positive barrier between body steam chamber and process fluid through port 185 by improving the seal between the seat and the seat plate. In some embodiments the steam chamber comprises a first side of bellows and is isolated from the process fluid. In some embodiments the seat plate is used to maintain constant contact with gate in all positions such that all process fluid is captured and isolated from the valve body chamber. In some embodiments the floating seat plate allows for axial seat travel upstream and downstream to balance sealing load on both sides of gate as the temperatures inside the drum, opening and through the bottom of the valve change. In some embodiments an axial hard stop on each seat allows the upstream seat to maintain sealing contact with gate.

In some embodiments an extended floating seat plate 24 extends on each side of the gate to prevent the process fluid from entering the body. In some embodiments the extended floating seat plates are dynamic and spring loaded by a caliper in the bottom of the valve which bias the floating seat plate against the seat. In some embodiments plates are further biased or loaded against the seat by a positive pressure steam charge in body cavity when in operation. In some embodiments a dual dynamic live-loaded seating provides bi-directional sealing such that the floating seat plate seals equally with high pressure from either flange end.

In some embodiments a bellows is seal welded to the two independent rings eliminating steam bypass between rings. In some embodiments the bellows if made of INCONEL® to prevent degradation or failure from the heating and cooling cycles. In some embodiments springs are used provides the initial sealing force to maintain seal at lower pressures. In some embodiments INCONEL® coil springs are used. In some embodiments a bellows effective area provides additional force under higher pressures to maintain sealing force required. In some embodiments a shoulder bolt assembly holds the seat assembly 145 together and sets the travel limits of the seat when valve is stroking to prevent over travel into the gate port In some embodiments a connection between the dynamic seat ring and the extended floating seat plate is formed to improve the seal between the seat ring and the floating seat plate. In some embodiments In the following description, numerous references will be made to processing equipment such as steam and drum structures, but these items are not shown in detail in the figures. However, it should be understood that one of ordinary skill in the art and in possession of this disclosure, would readily understand how the present disclosure how the structures can be incorporated.

Detailed references will now be made to the embodiments of the disclosed invention, examples of which are illustrated in FIGS. 1-11 illustrate various views of a valve with a floating seat plate in accordance with one or more embodiments of the invention.

General Discussion on the Delayed Coking Process and the De-Heading of Coke Drums In the typical delayed coking process, petroleum residues are fed to one or more coke drums where they are thermally cracked into light products and a solid residue—petroleum coke. Several different physical structures of petroleum coke may be produced. To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown.

Due to the shape of the coke drum, coke accumulates in the area near and attaches to the flanges or other members used to close off the opening of the coke drum during the manufacturing process. To empty the drum, the flanges or members must first be removed or relocated. In the case of a flanged system, once full, the coke drum is vented to atmospheric pressure and the top flange is unbolted and removed to enable placement of a hydraulic coke cutting apparatus. Removing or opening the bottom flange, or valve is commonly known as "de-heading" because it removes or breaks free the head of coke that accumulates at the surface of the flange or valve. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Embodiments of a Coke Drum De-Heading Systems

Although the present disclosure may be utilized in association with both top and bottom de-heading systems, or rather the de-heading system independent valve actuator system of the disclosed invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system.

The present disclosure describes a valve system and method for unheading or de-heading a coke drum following the manufacture of coke therein. As the disclosed invention is especially adapted to be used in the coking process, the following discussion will relate specifically in this manufacturing area. It is foreseeable however, that the disclosed invention may be adapted to be an integral part of other manufacturing processes producing various elements or by products other than coke, and such processes should thus be considered within the scope of this application. For example, it is contemplated that the disclosed invention de-header system and de-header valves may be utilized within other critical service applications, such as inlet feed line isolation, blowdown isolation, fractionator isolation, and back warming.

FIG. 1 depicts, generally, a petroleum manufacturing and refinery process 8 having several elements and systems present (identified, but not discussed). In addition to these elements, petroleum manufacturing and refinery process 8 further comprises at least one coke drum and may include, as illustrated, a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Figure 2:
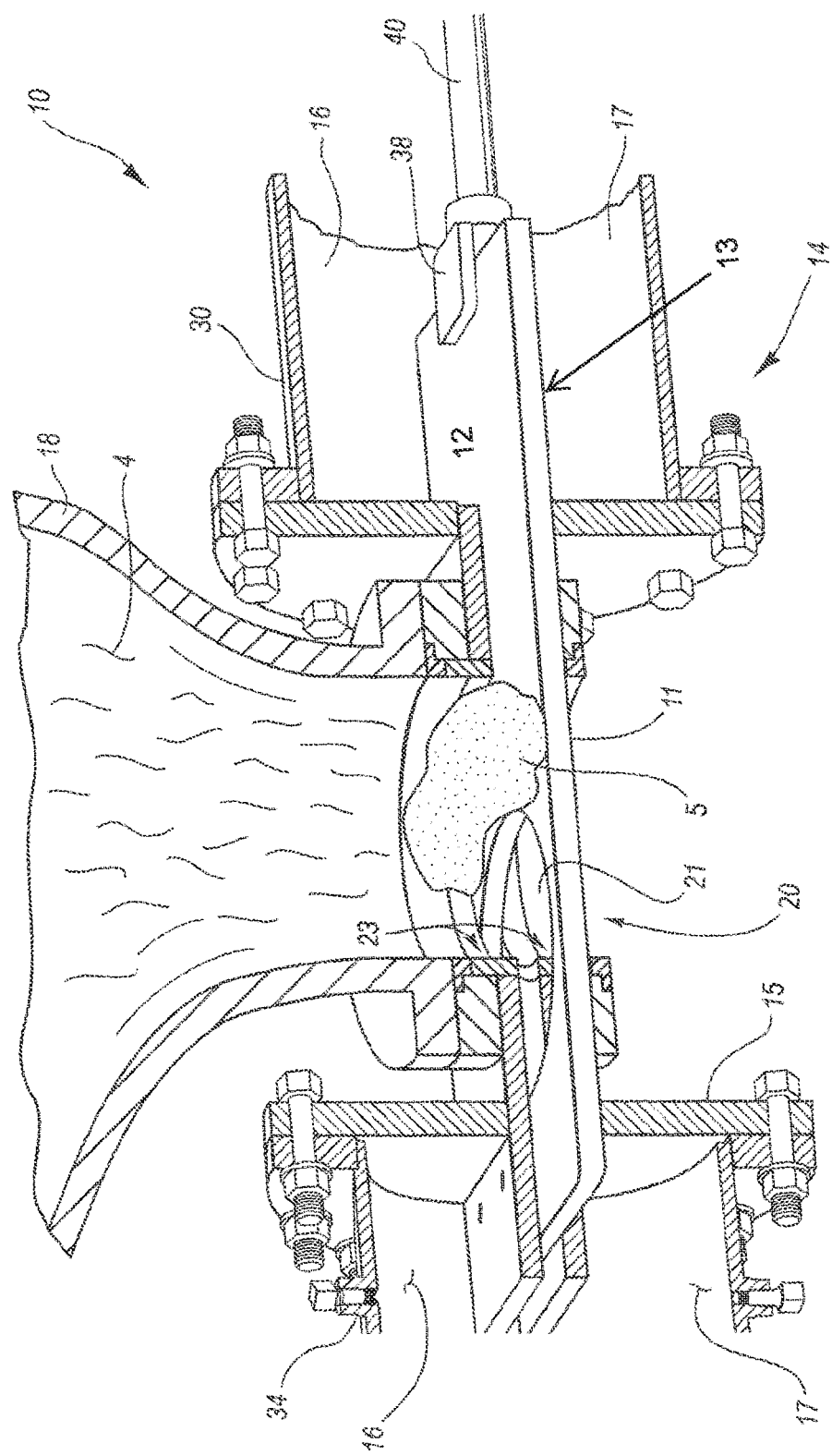
FIG. 2 illustrates an embodiment of a drum deheading valve.

FIG. 2 illustrates a non-limiting example of a de-heading system 10. Coke drum de-heading system 10 comprises a de-header valve 14 that removably couples to a coke drum 18 using various means known in the art. De-header valve 14 typically couples to coke drum 18 or a spool at its flanged port or opening, much the same way a flanged head unit would be attached in prior related designs. De-header valve 14 is shown further attaching to upper and lower bonnets 30 and 34, respectively.

The seat system of the de-header valve is designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIG. 2 illustrates a non-limiting example of a sliding blind gate-type de-header valve 14, according to one exemplary embodiment of the disclosed invention. Sliding blind gate-type de-header valve 14 comprises a main body 15 removably coupled to upper and lower bonnets 30 and 34, each comprising upper and lower chambers 16 and 17, respectively. Main body 15 comprises an opening or port 20 therein. Main body 15 removably couples to a complimentary flange portion and associated opening or port of a coke drum 18 or a spool, such that each opening is concentric and aligned with one another.

Sliding blind gate-type de-header valve 14 further comprises a valve closure in the form of a sliding blind or gate 11. Some embodiments of a gate 11 may have an aperture therein that is capable of aligning with the opening in the coke drum and/or the opening in the spool, as well as the opening in the main body of the valve 20. Alternatively, some gates may be solid, not utilizing an aperture therein, but rather utilizing a short gate that effectively opens the valve to allow coke from a coke drum 18 to fall through a valve when the shortened gate 11 is retracted into the upper bonnet 30.

The gate 11 slides back and forth in a linear, bi-directional manner between means for supporting a valve closure, shown in this exemplary embodiment as seat support system 26. Seat support system 26 may comprise any type of seating arrangement, including dual, independent seats, wherein the seats are both static, both floating or dynamic, or a combination of these. Seat support system 26 may alternatively comprise a single seat in support of valve closure 11, wherein the seat may comprise a static or floating or dynamic seat. In another exemplary embodiment, means for supporting a valve closure may dispense with a seating system in favor of a support system built into main body 15, such that one or more portions or components of main body 15 are selected and prepared to support valve closure 11. In any event, seat support system may comprise a metal contact surface that contacts and seals with a metal surface on valve closure 11, wherein this contact seal is maintained during the coke manufacturing process.

Valve closure 11 is coupled to clevis 38, which is turn coupled to valve stem 40. Valve stem 40 may be utilized as an element of a system that functions to cause valve closure 11 to oscillate between an open and closed position. An actuator system 36 may be a hydraulically controlled power source contained within cylinder and that is capable of moving valve closure 11 through its linear, bi-directional cycle during a coking process, and may be utilized to de-head and re-head the coke drum 18. Alternatively, an actuator system 36 may be an electrically controlled power source utilizing an electric actuator 42 that is capable of moving a valve closure via a transmission system 44 through its linear, bi-directional cycle during a coking process, and may be utilized to dehead and rehead the coke drum.

Figure 3:
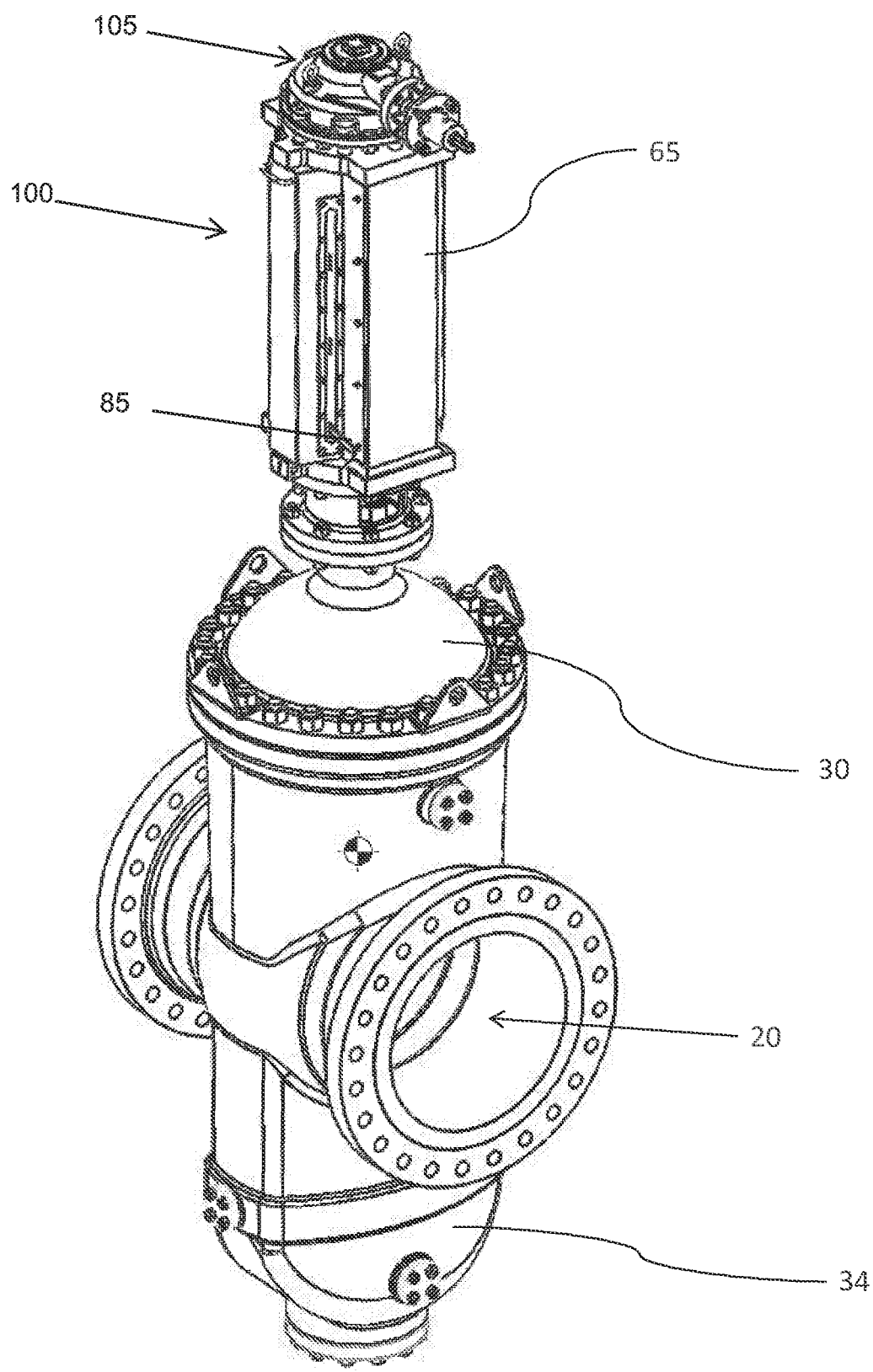
FIG. 3 illustrates a valve.
Figure 4:
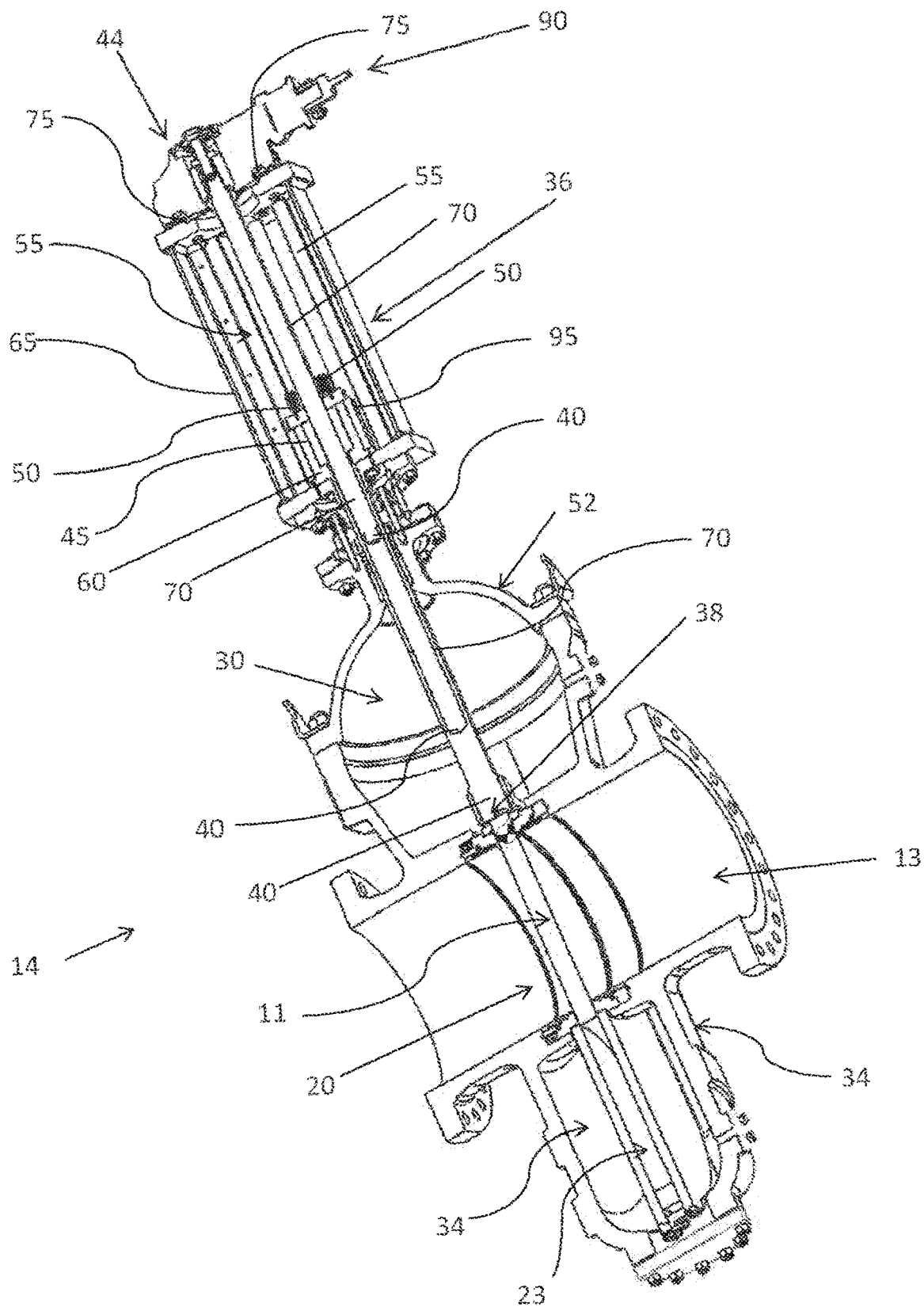
FIG. 4 illustrates cut away view of a valve.
Figure 5:
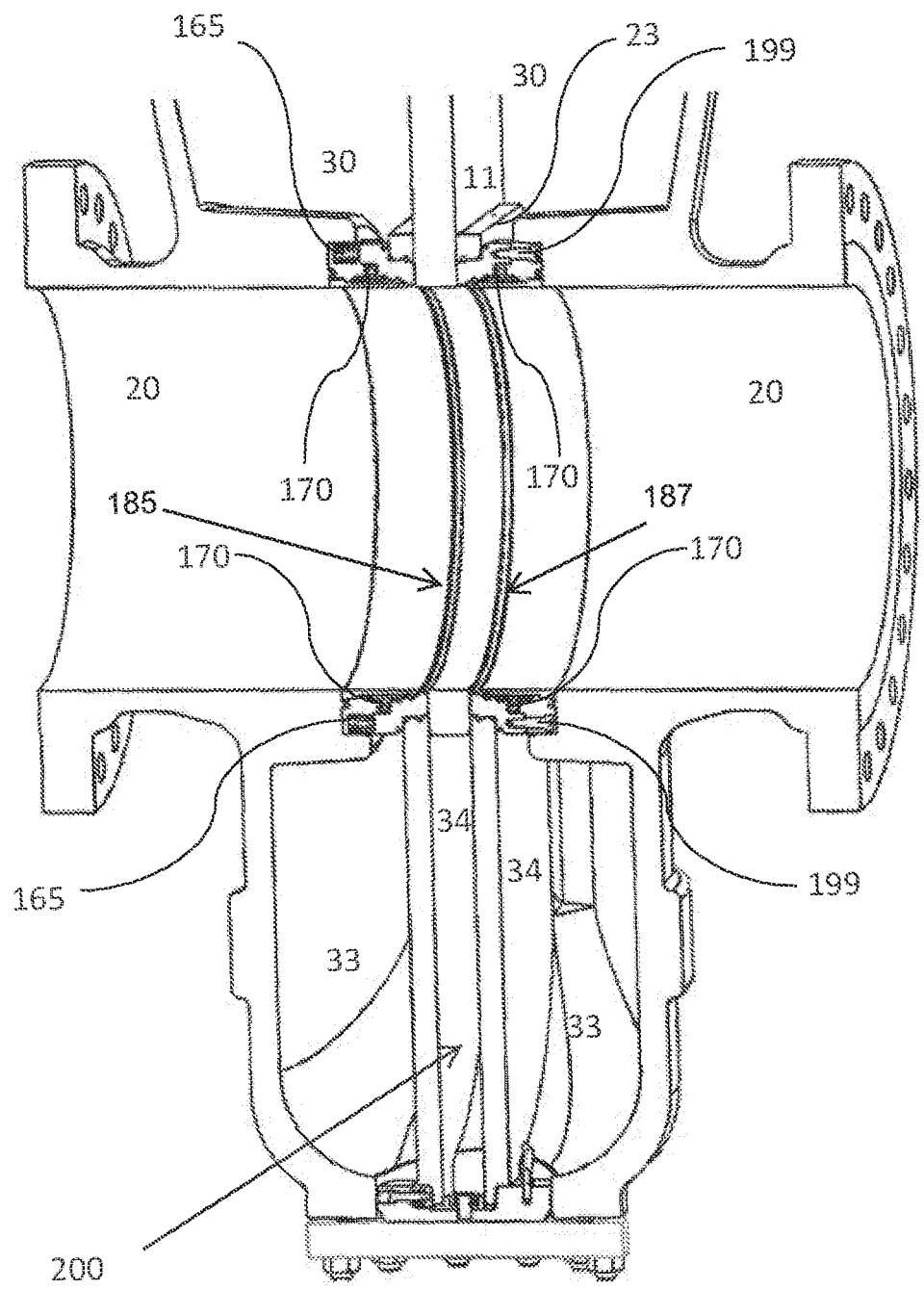
FIG. 5 illustrates cut away view of valve opening with gate in the open position.
Figure 6:
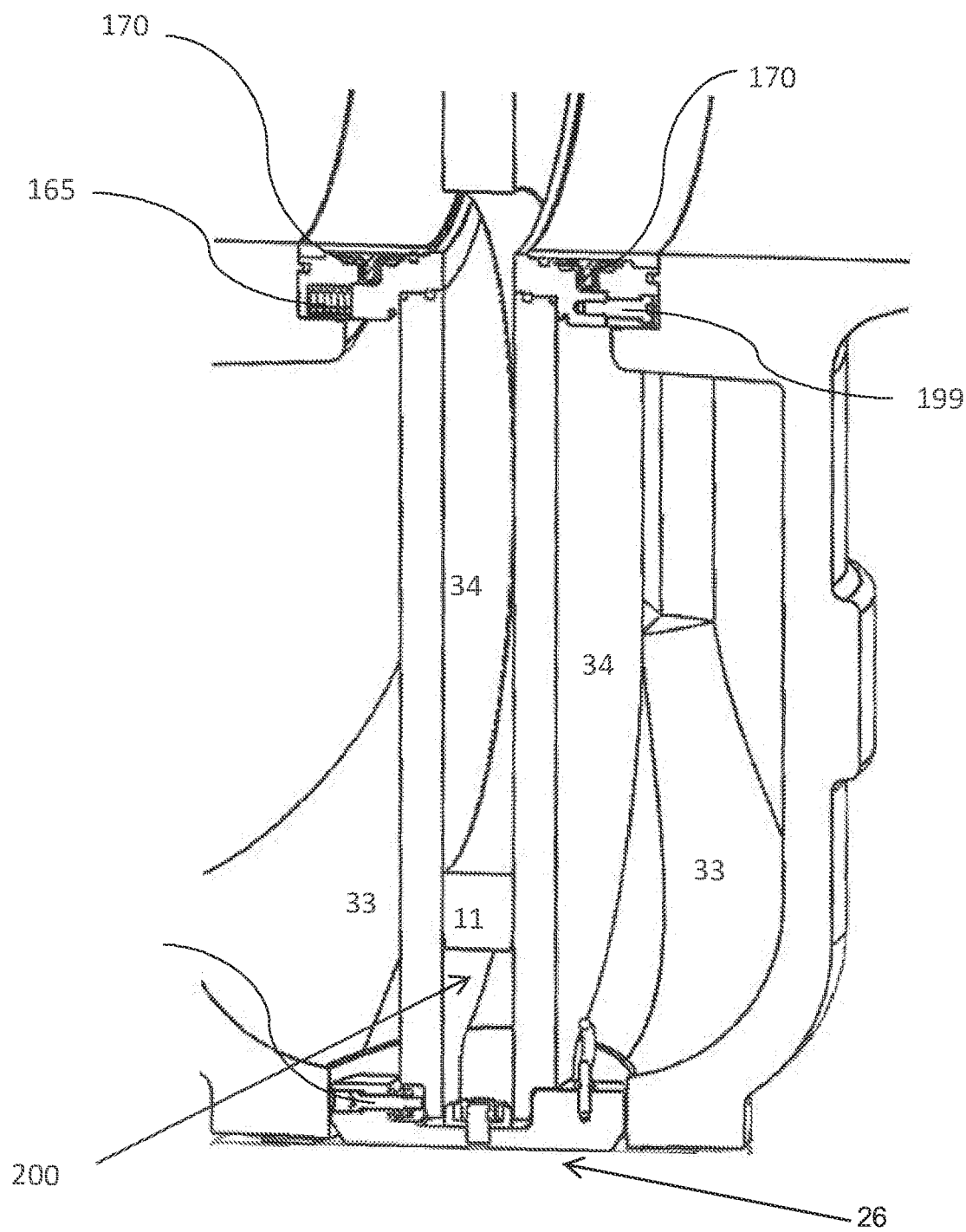
FIG. 6 illustrates cut away view of valve opening with gate in the partially closed position.
Figure 7:
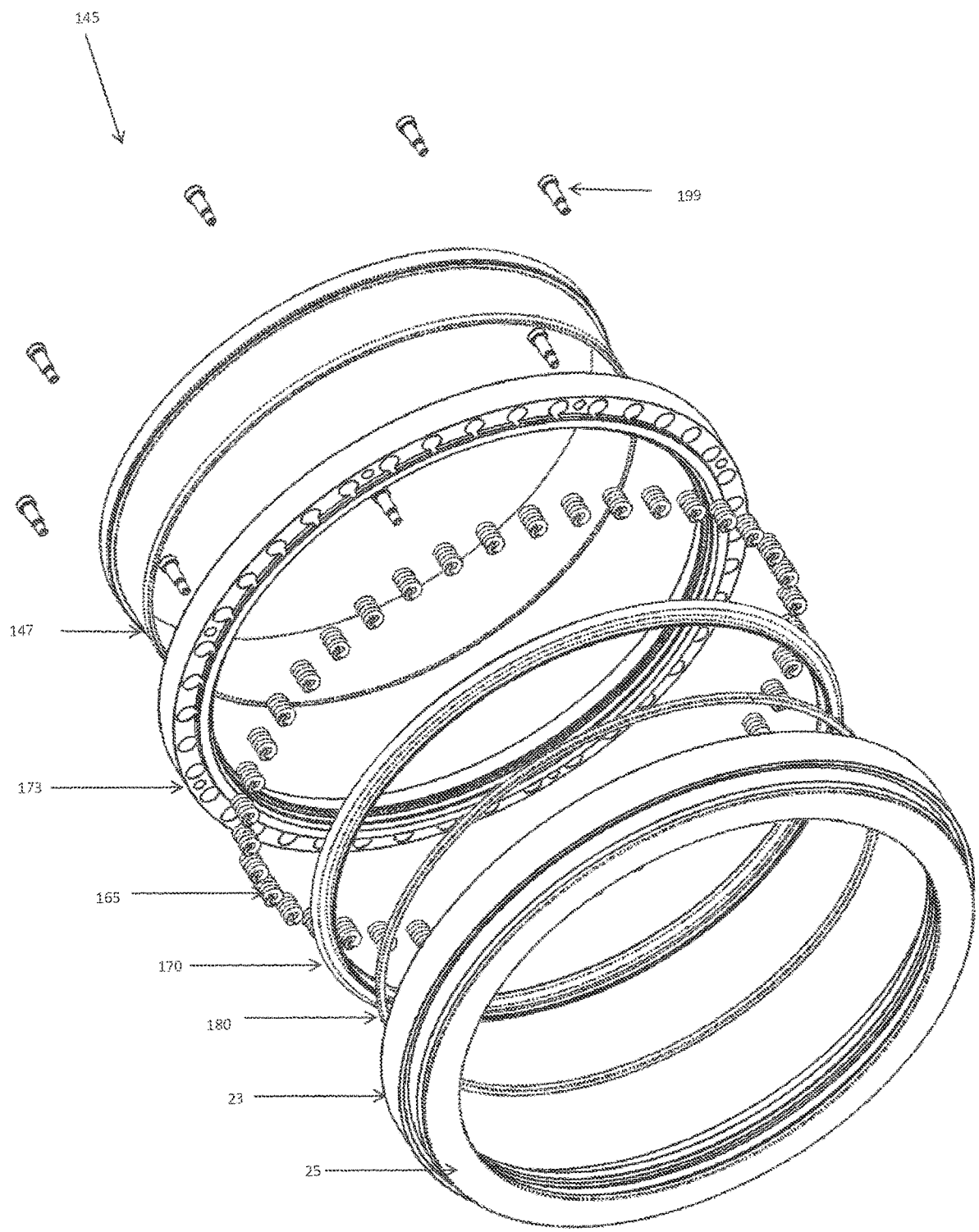
FIG. 7 illustrates exploded view of seat assembly.
Figure 8:
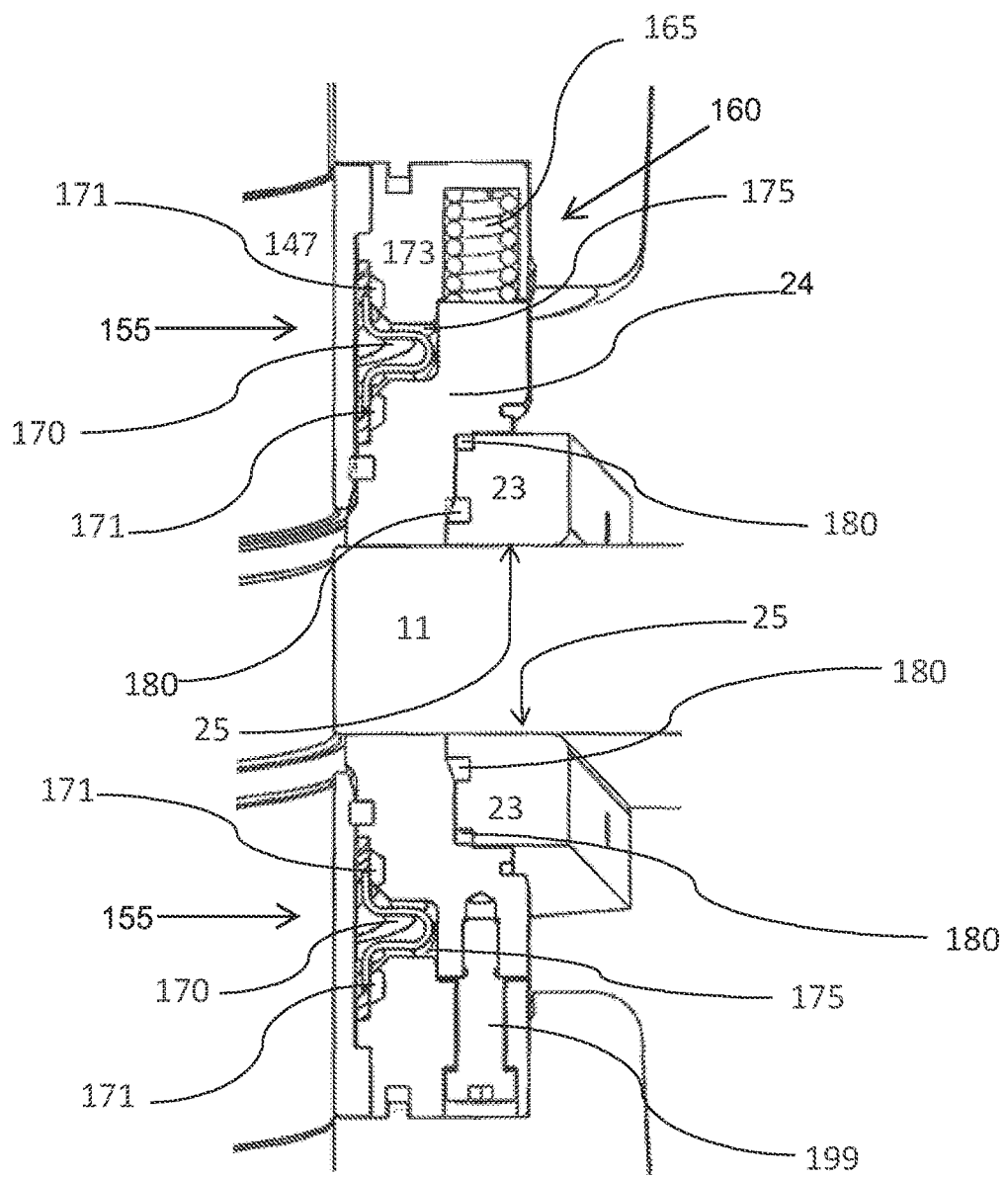
FIG. 8 illustrates close-up cut away view of the sealing assembly and bias assembly.
Figure 9:
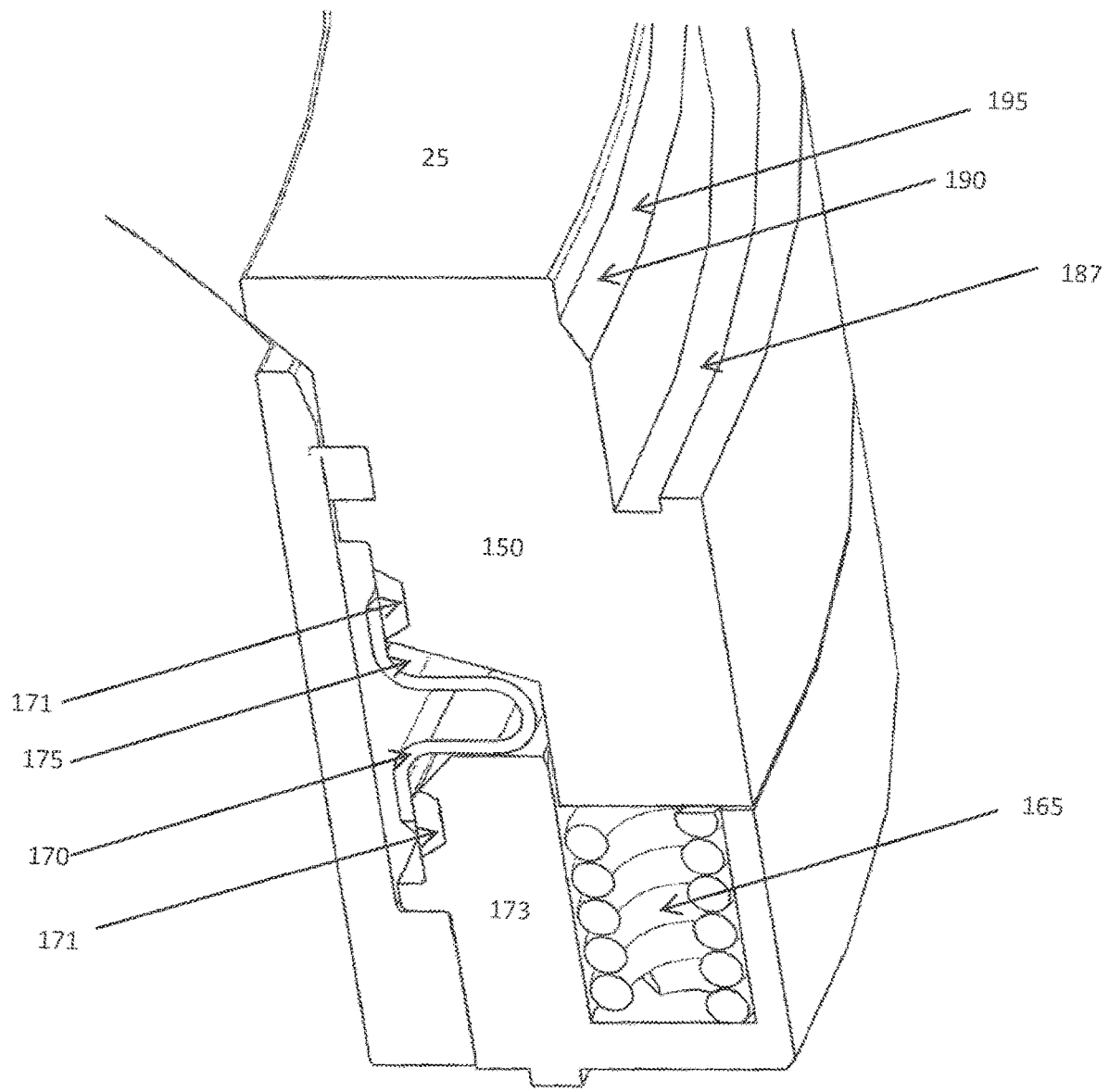
FIG. 9 illustrates cut away view of floating seat assembly separated from the seat.
Figure 10:
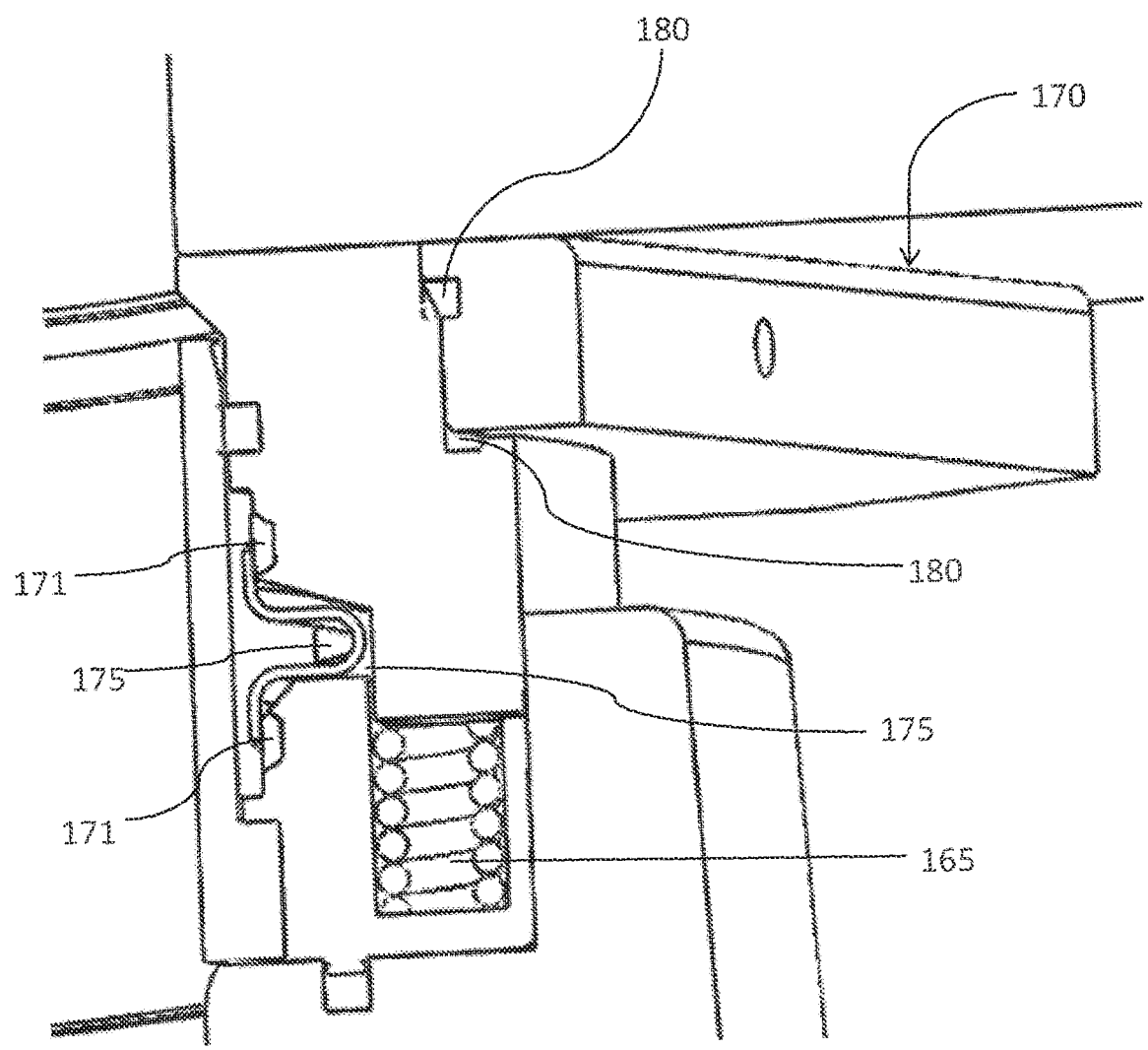
FIG. 10 illustrates an embodiment of the bias assembly and sealing assembly floating seat plate and seat and packing.
Figure 11:
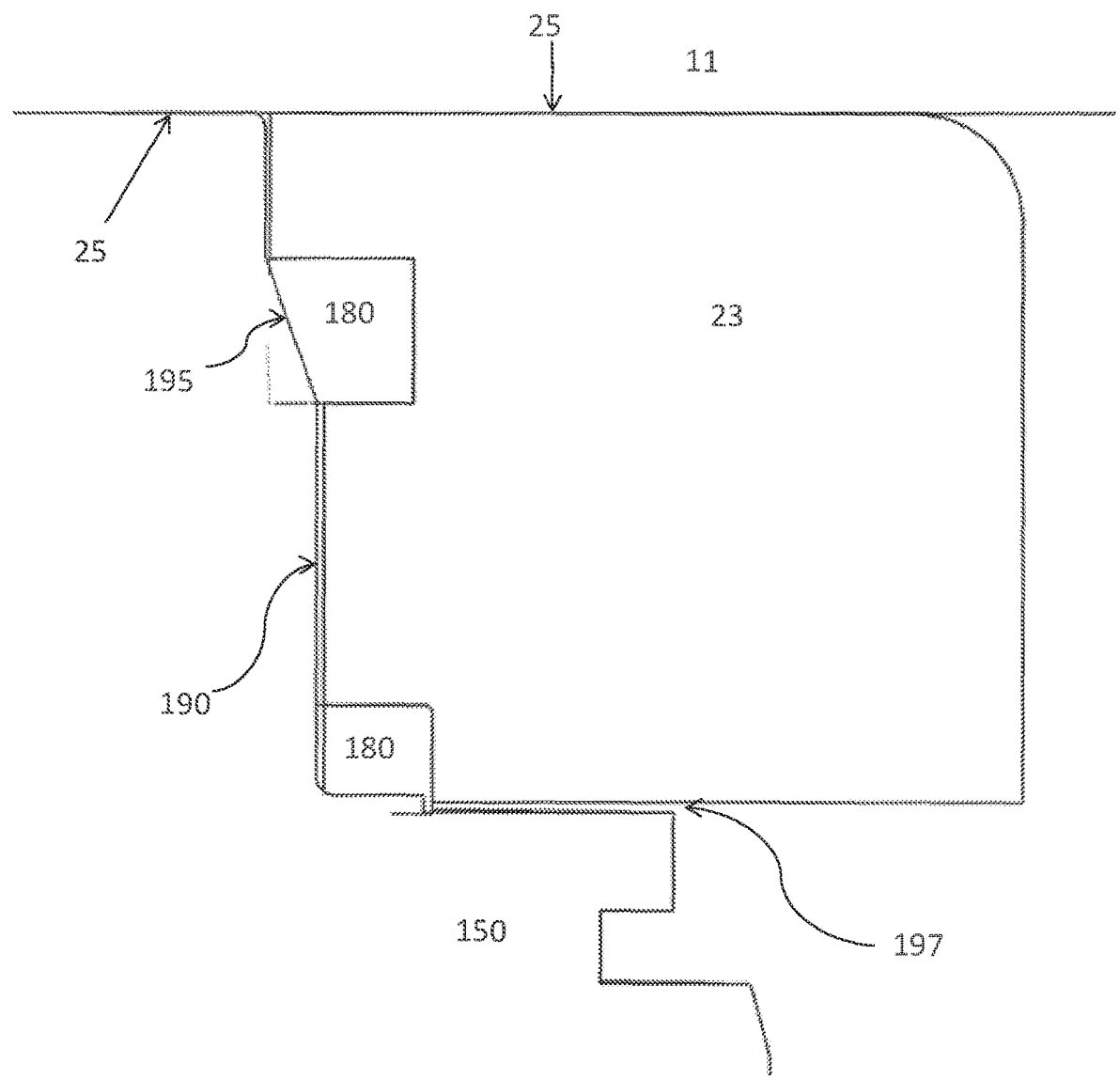
FIG. 11 illustrates the interface between the floating seat plate and the seat and packing.
Figure 12:
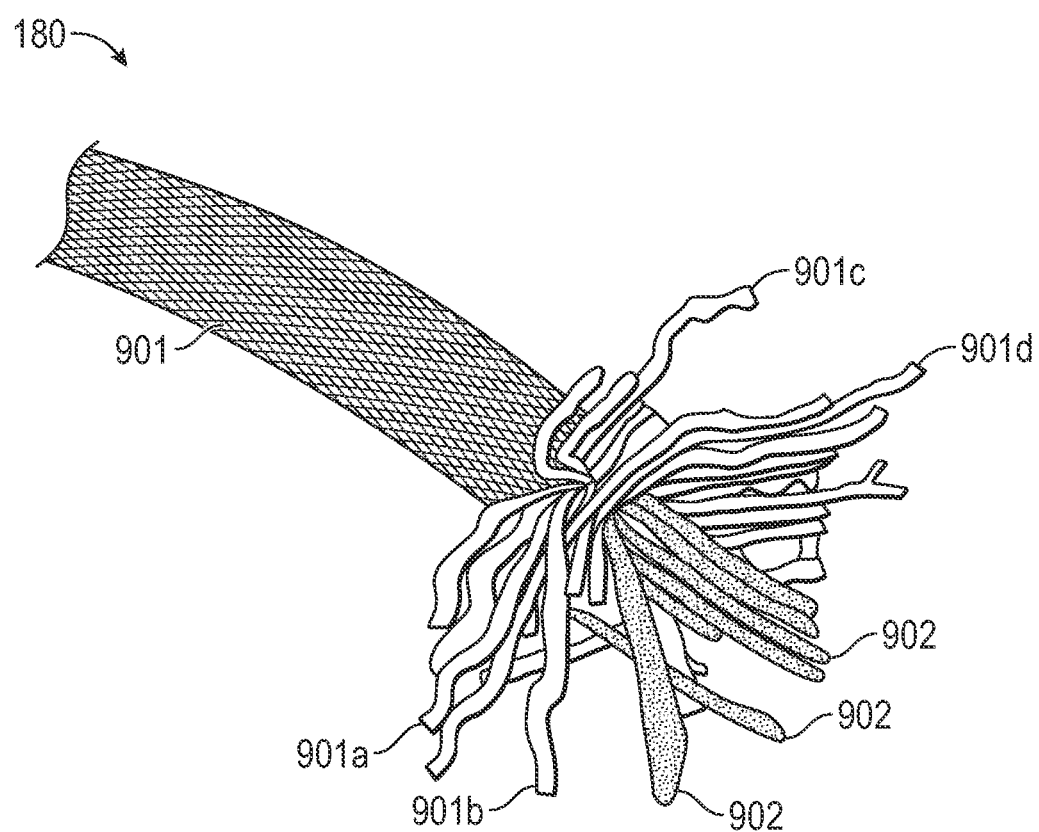
FIG. 12 illustrates packing.

Detailed references will now be made to the preferred embodiments of the disclosed invention, examples of which are illustrated in FIGS. 3-4 illustrate various views of a torque isolating valve actuator in accordance with one or more embodiments of the invention. In some embodiments coke drum deheading system 10 is disclosed wherein a valve 14 comprising an actuator housing 65, an upper bonnet 30 and lower bonnet 34. In some embodiments the actuator housing 65 may be a hollow housing configured to house other components. In some embodiments the actuator housing 65 may enclose interior components. In some embodiments the actuator housing 65 may partially enclose internal components. In some embodiments the actuator housing 65 may comprise an internal lubricant pooled in the actuator housing 65 and circulated around internal components to reduce friction caused by movement of internal components. In some embodiments the actuator housing 65 may be rigid and configured to provide structural support to internal components, as well as brace against a torque moment created during actuation by the operation of internal components. In some embodiments the internal components housed in the actuator housing 65 are internally lubricated, and the actuator housing 65 may have access ports which are not sealed. In some embodiments the actuator housing 65 may a power port 90 to power the actuator mechanism which may be powered pneumatically, electrically or mechanically.

In some embodiments the actuator housing 65 houses a nut housing 45 disposed within the actuator housing 65. In some embodiments the nut housing comprises an actuator end proximal an actuator 105 and a stem end, on the opposite end of the nut housing 45, disposed adjacent the stem 40. In some embodiments the actuator comprises an actuator motor 105 disposed on the actuator end of the nut housing 45. In some embodiments the actuator motor 105 is pneumatically powered. In some embodiments the actuator motor 105 is electrically powered. In some embodiments the actuator 100 is manually driven. In some embodiments the actuator housing 65 comprises a channel through which an indicator 85 indicates the position of the nut housing. In so embodiments the indicator 85 indicates the position of the gate in its stroke. In some embodiments the indicator 85 will indicate to an operator whether the gate is open, partially open or closed. In some embodiments the actuator is configured to move the stem 40 bi-directionally through the valve 14 to cause a gate or blind 11 to move to an open or a closed direction.

Referring now to FIGS. 5-11 which discloses a floating seat plate configured to isolate process fluid from entering the valve body. In some embodiments separating the seat 23 from the floating seat plate 24 improves and simplifies manufacturing by requiring the smaller floating seat plate be ground flat instead of the combined seat plate 24 and seat 23. In some embodiments the floating seat plate 24 improves the distribution of loads on the seat 23 created during delayed coker process. The improved load distribution is accomplished in part by the isolation of the seat plate 24 from the seat 23. During coke processing the material is heated to its cracking temperature (approximately 900° F. (500° C.)) and is placed under pressure in a drum. The heat causes the equipment, including the seat 23, gate 11 and the floating seat plate 24 to thermally expand and change shape. In addition, the pressurized drum challenges the seal between the seat 23, gate 11 and seat plate 24. In some embodiments the floating seat plate 24 isolates the pressure on the seat 23 so as to allow fewer leaks because the seat is not influenced by the seat attachment. In addition, in some embodiments the at least partially independent movement by the floating seat plate 24 allows the seat 23 to partially isolate the pressures inside the drum body from impacting the seat, making the seat 23 pressure more uniform. Finally, separating the seat 23 and the floating seat plate 24 provides greater control and ability to manipulate the force between the floating seat plate 24 and the seat 23 using the spring rates so that the seal is fully loaded by the seat.

In some embodiments the floating seat plate improves the seal between the seat plate 24 and the seat 23 and the seal between the seat plate 24 and the gate 11, particularly as the gate thermally expands and deforms. In some embodiments the seat plate 24 is self-leveling against the gate and comprises a ball/cone and socket configuration to allow articulation by the seat. In some embodiments the cone and socket configuration is provided by the angled shelf 195 and packing 180 at the interface between the seat plate 24 and the seat 23. As the gate 11 or seat 23 thermally expand and change shape, the floating seat plate 24 is able to articulate and maintain a seal independent of the orientation of the seat 23. In some embodiments the spring 165 presses the seat 23 against the gate 11 while a bellows 170 is activated by internal pressuring from the steam port 185 to expand the bellows 170 and assist the springs 165 to apply more load on the gate 11 to seal the drum for the delayed coking process. Shoulder bolts 199 hold the assembly 145 together and set travel limits for the floating seat plate 24.

In some embodiments the valve comprises a first port 185. In some embodiments the valve comprises a plurality of ports 187. In some embodiments ports 187 are in fluid communication with the valve body so that steam can transport from the valve body through ports 187 to steam chambers 175 comprise channels formed in the seat assembly 145. In some embodiments the operation of the floating seat plate 24 protects the ports 185 from process fluid in the body and which passes through the opening 20 as the drum is emptied. In some embodiments two seat plate directly abut seats 23 and gate 11 and prevent process fluid from entering the gate port 18020. In some embodiments the valve comprises lower bonnet plates 34 configured to receive the gate 11 when it is placed in the closed position. In some embodiments the lower bonnet plates 34 isolate the valve 14 from the process fluid which may migrate with the gate 11 as it is moved from a first position to a second position. In some embodiments the floating seat plate 24 protects the port 185 at all times from the inside of the bonnet 30, 33 so when the gate 11 hole opens the opening 20 and prevent exposure of the ports 185 or the inside of the valve to the process fluid.

In some embodiments an isolation valve 14 is configured to isolate a valve body from the process fluid passing through the valve opening 20. In some embodiments a seat 23 has a receiving portion that is configured to receive a gate. In some embodiments the receiving portion is in the middle of the seat 23 body. In some embodiments the seat comprises a seat assembly 145 with a seat assembly 145 disposed on opposite sides of a gate 11 having a first side 12 and a second side 13 and aligned so as to create an opening through which process fluid can selectively pass. In some embodiments the two sides of the seat are bolted together to create a seal between the seat and the gate 11. In some placed two separate seats which are disposed adjacent the gate 11, with a first seat 23 adjacent first side 12 of the gate 11 and a second seat 23 placed adjacent the second side 13 of the gate 11. In some embodiments the gate 11 is configured to be selectively positioned intermediate a first seat and a second seat.

In some embodiments the seat assembly 145 comprises a floating seat plate 24. In some embodiments the floating seat plate 24 is nested inside the inner circumference of the seat 23 so as to abut the seat 23. In some embodiments the floating seat plate 24 is concentrically nested between the seat 23 and a valve opening 20 without being attached to the seat 23. In some embodiments the seat plate 24 is configured to articulate independent of the seat 23, to accommodate gate 11 deformations due to thermal expansion or thermal differentials created by greater heat being applied to one location over on the surface of the gate 11 such as when the heat is applied to the gate's first side 12 and not equally applied to the gate's second side 13. In addition, in some embodiments the floating seat plate 24 comprises degrees of motion to accommodate different pressures formed inside the coking drum during the coking process.

In some embodiments the seat assembly 145 comprises a sealing system 155 which improves the seal between the seat plate 24, the seat 23. In some embodiments the sealing system 155 comprises a bias system that selectively seals the seat plate 24 and the seat 23 that biases the seat plate 24 against the seat 23. In some embodiments the sealing system 155 comprises mechanical shapes and packing members 180 which are integrated at the interface between the seat and the seat plate.

In some embodiments the bias system 160 of claim 1 further comprises a first bias member 165. In some embodiments the bias system comprises a first bias member 165 and a second bias 170. In some embodiments the bias system comprises a first bias member 165, a second bias member 170, and a third bias member 175. In some embodiments the bias member comprises a spring 165. In some embodiments the bias member comprises a bellows 170. In some embodiments the bias member comprises a steam chamber 175. In some embodiments the bias system 160 comprises any combination of bias members which function cooperatively to bias the floating seat plate 24 against the seat 23. In some embodiments the bias system functions to bias the floating seat plate 24 against the gate 11. In some embodiments the bias system comprises a plurality of bias members configured to bias the floating seat plate 24 against a first side of the gate 12 and to bias the floating seat plate 24 against the second side of the gate 13. In some embodiments the bias system 160 further comprises a third bias member positioned on the second side 13 of the gate configured to bias the seat plate 24 against the seat 23 in a direction of the gate configured to seal the seat plate 24 and the seat 23 against both the first side 12 and the second side 13 of the gate. In some embodiments the bias system comprises as bias assembly 145 limited in travel by a shoulder bolt 199.

In some embodiments the bias system 160 comprising a combination of cooperatively operating bias members improves the seal to meet American Petroleum Institute ("API") standards. In some embodiments the floating seat plate 24 is ground flat and positioned in the center of the gate 11. In some embodiments the seat plate 24 is biased against the seat using springs creating a force of nearly 200 PSI. In some embodiments, in addition to biasing the seat plate 24, the springs give the seat plate 24 degrees of freedom and allows the seat plate 24 to move and adjust to the so to maintain constant contact with the gate 11 and allows the seat plate 24 to remain in mutual contact with the gate 11 through the thermal cycle. In some embodiments the port 185 further comprises a steam chamber which can be selectively pressurized to expand the chamber and further bias the seat plate 24. The bellows 170 is welded 171 to a first packing 180, which in some embodiments is a seat plate 24, and a retainer 173. In some embodiments bellows 170 is welded 171 to the seat plate 24 and a packing 180 so as to seal the steam in the steam chamber 175. In some embodiments, as the steam pressure is increased the steam chamber 175 expands the bellows 170 expands and the seat plate 24 is further biased against the seat 23 and the gate 11 to improve the seal between the gate 11 the seat 23 and the seat plate 24. In some embodiments the bias system creates a cumulative cooperative force sufficient to meet or exceed the API standards of 820 PSI.

In some embodiments the seat plate 24 comprises a shelf 195 which interfaces with the seat 23. In some embodiments the shelf 195 is angled to give the seat a conical shape as it mates with the seat 23. In some embodiments packing 180 is inserted into the seat-seat plate interface 190 and upon activation the angled shoulder 195 is pressed into the seat 23 at the interface 190 and energizes packing 180 by changing the shape of the packing 180. In some embodiments biasing the seat plate 24 against the seat 23 deforms the packing 180. In some embodiments, when gate 11 deforms by thermal expansion during the heating cycle, the floating seat plate 24 articulates its position to maintain the seal between the seat 23 and the seat plate 24 and the gate 11 and the seat plate 24. In some embodiments floating seat plate 24 adjusts to the changing surface dimensions of the gate 11 as the gate 11 repositions from an open position to a closed position or a closed position to an open position. In some embodiments the packing 180 may be comprise a square cross section with dimensions that are approximately the same as the interface 190. In some embodiments the packing 190 will be slightly larger than the shape of the interface 190. In some embodiments packing 180 will comprise a segment of packing 900 that can be used as packing 504 or packing 505 in a deheading valve in accordance with one or more embodiments of the present invention. As shown, packing 900 includes a woven outer sheath 901 (where 901a-901d identify various unwound strands of the sheath). Woven outer sheath 901 comprises expanded graphite with an oxidation resistant additive. Packing 900 also includes a woven wire mesh core 902. In packing 900, woven wire mesh core 902 is comprised of multiple woven Strands (as indicated by the multiple arrows). Each of the woven strands comprises an Inconel® or Monel® (or similar type) alloy. In other embodiments, a single (larger) woven Strand may be used as woven wire mesh core 902. Also, in some embodiments, a single strand of packing 900 can be used for packing 505. In other embodiments, two or more stands of packing 900 can be used for packing 505.

In some embodiments packing 180 provides the conically shaped floating seat plate 24 with freedom of movement to articulate with gate 11 thermal expansion as the valve moves through the thermal cycle. In some embodiments the packing 180 improves the seal between the seat 23 and the floating seat plate 24 even as the seat plate 24 repositions in response to gate 11 shape changes. In some embodiments the floating seat plate 24 maintains a radially biased force against the packing 180 and seat 23 and the gate 11 even as the shape of the gate 11 changes. In some embodiments the floating seat plate 24 maintains a radially biased force against the packing 180 and the seat 23 and the gate 11 even as body pressure vectors in the coking drum change direction and magnitude and exert direction-specific forces against the seat 23. In some embodiments the seat plate 24 and packing 180 isolate the seat 23 from pressure in the body during processing.

In some embodiments packing 180 allows the floating seat plate 24 end-to-end movements so gate 11 and floating seat plate 24 and seat 23 touch simultaneously. In some embodiments the packing 180 does not necessarily seal the interface between the seat plate 24 and the seat 23, but instead provides for axial movement so the seat plate 24 can become mutual with the seat 23. Thus in some embodiments as the gate 11 deforms under thermal expansion the seat plate 24 can reposition independent of the seat 23 to improve the contact, and thus the seal between the seat plate 24 and the gate 23.

In some embodiments in addition to being welded 171 to the seat plate 24 to isolate steam, bellows 170 is cooperatively biased with the seat plate to enhance and improve the sealing force between the seat plate 24, the seat 23 and the gate 11. The bellows 170 is welded 171 to the seat plate assembly 145 to isolate a steam chamber 175. In some embodiments bellows 170 isolates the steam chamber, port 185 and valve body from process in the chute comprising valve opening 20 through which process passes as drum is emptied. In some embodiments the bellows 170 is configured to flex as steam pressure is applied to increase the bias force of the seat plate assembly 145 against the gate 11. In some embodiments the bellows 170 is made from materials which can be welded. In some embodiments bellows 170 comprises INCONEL®, a nickel chromium-based superalloy or a nickel alloy (e.g. a Monel® alloy). In some embodiments bellows 170 are configured with a single spring fold 166, while in some embodiments bellows 170 is configured with multiple sprig folds 166, the number of folds is determined by the force required and the amount of desired movement. In some embodiments bellows 170 comprises bellows tabs which overlap with adjacent structures. In some embodiments bellows tabs provide a welding surface 171 wherein the bellows tab is welded 171 to the adjacent structure. In some embodiments the adjacent structure comprises the floating seat plate 24. In some embodiments a bellows tab is welded 171 to a packing 180. In some embodiments, the steam chamber 175 is configured on the surface of the bellows 170 which faces away from the central opening 20, while in some embodiments the steam chamber 175 is against the bellows surface 175 which faces towards the central opening 175. In some embodiments steam enters steam chamber 175 through port 185, increasing volume of the steam chamber 175. In some embodiments the chamber 175 volume increase and the steam cooperatively biases other bias members such as spring 165 and bellows 170 to increase the bias force seat plate 24 places against the seat 23 and the bias force the seat plate 24 exerts against the gate 11 and the force the seat 23 places against the gate 11. In some embodiments bellows 170 is a solid sheet of material that is folded and compressed to maintain a bias.

The weld 171 may be formed by any suitable technique including but not limited to electric arc, laser welding, TIG and electron welding to name a few examples. This weld 62 ensures a fluid tight joint or seal between the bellows 170 and the packing 180 so that fluid flow in the valve opening 20 is restricted to between the first and second ports 36, 38 and also that process fluid does not enter into the upper bonnet 30 and lower bonnet 33 actuator 65 or escape to the outside environment.

In some embodiments the valve is configured to continuously force steam through the port 185 and steam chamber 175. In some embodiments positive steam pressure in the body is maintained and configured to continually force steam out of the steam body and into the valve opening 20 to prevent process from entering the steam chamber 175, the port 185, or the valve body 52. In some embodiments the seat plate 24 seat plate 24 maintains constant contact and load against the gate 11 to keep sealing surfaces 25 protected. In some embodiments the seat plate 24 is an extended seat plate 197 that maintains constant contact with the gate 11 in all positions through the gate stroke such that all process is captured and not allowed to enter the body chamber 35.

In some embodiments packing 180, 185 changes shape as floating seat plate 24 presses on packing 180 and radially compresses the packing 180 to improve the seal between the seat plate 24 and the seat 23. In some embodiments packing 180 cushions the floating seat plate 24 seat 23 interface 190 to permit seat plate 24 to maintain its degrees of freedom under bias, thus even as the gate 11 thermally expands under the heat and pressure of the heat cycle, the floating seat plate 24 "floats" or articulates to maintain the seal between the seat plate 24 the seat 23 and the gate 11 in a ball/cone and socket manner. In some embodiments the valve comprises two floating seat plate 24 to allow for sufficient axial seat travel upstream and downstream in the opening 20 to balance the sealing load on both sides of the gate 11. In some embodiments the shoulder bolt 199 acts as an axial hard stop on each seat on each side of the gate 11 allowing the upstream seat 23 to maintain its sealing contact with the gate 11. A retainer In some embodiments the extended seat plates 23 on each side of the gate 11 prevent the process from entering the body as the valve closes the gate port and exposes the process into the body, typically on other through conduit slab gate valves. In some embodiments extended seat plate 24 are dynamic and spring loaded by the caliper in the bottom of the valve. In some embodiments seat plate 24 are further loaded or biased by a positive pressure steam charge in body 35 when in operation. In some embodiments floating seat plate 24 extends 197 beyond the seat 23. In some embodiments floating seat plate 24 is configured to maintain constant contact with the gate such that all process fluid is isolated from the seat 23 and prevented from entering the valve body.

In some embodiments the valve may comprise a sealing system 155 which seals the valve closed to maintain a minimum pressure inside the coke drum. In some embodiments the sealing system 155 comprises a steam chamber 175 which is isolated from the drum. In some embodiments the sealing system 155 further comprises packing 180 configured to improve the seal between the seat plate 24 and the seat 23. In some embodiments the sealing system 155 comprises the dual dynamic live-loaded floating seating plates which provide bi-directional sealing that seals equally with high pressure from either flange end of the opening 20. In some embodiments the sealing system 155 comprises ICONEL® bellows 170 which are seal welded 171 to a first independent packing 180. In some embodiments bellows 170 is welded 171 to a retainer 173. In some embodiments bellows 170 is welded to both first and a retainer 173, eliminating steam bypass between rings. In some embodiments the bellows 170 acts as both a seal to isolate the opening 20 from the valve body 52, and a bias system 160 to bias the seat plate 24 against the seat 23 and the gate 11. In some embodiments the sealing system further comprises coil springs 165. In some embodiments the coil springs 165 are INCONEL® or some other super alloy and which provides the initial sealing force to maintain seal at lower pressures without the additional bias force created by steam. In some embodiments the sealing system 155 further comprises shoulder bolts 199. In some embodiments shoulder bolt 199 is configured to help hold the seat assembly 145 together. In some embodiments shoulder bolt 199 is configured to set the travel limits of the seat assembly 145 when the valve is stroking. In some embodiments shoulder bolt 199 is configured to prevent seat assembly 145 over travel into the gate port opening 20. Shield 147 shields the seat assembly from the flow-through.

Some embodiments comprise ports 185, 187 which provides fluid communication between the valve body 52 and the steam chamber 175. In some embodiments steam passes from the valve body 52 through one or both ports 185 or 187 and into the steam chamber 175 to bias the floating seat plate 24 against the gate 11 and seat 23. Some embodiments comprise ports 185, 187 formed in the seat 23 at the interface 190 between the seat 23 and the seat plate 24 and a conical seat plate 24 comprising an angled shelf 195 which is configured to create a radial force into the seat 23 when the seat plate 24 is biased against the seat 23. In some embodiments the port 187 further comprises packing 180 configured to improve the seal between the seat 23 and the seat plate 24. In some embodiments packing 180 comprises graphite, fiber glass, SPECTRA® fibers or carbon nanofibers, carbon nanotubes, extruded nanotubes or another appropriate material.

In some embodiments isolation valve 14 configured to isolate at least one port 185 on a seat plate 24 from a valve opening 20 comprises a gate having a first side 12 and a second side 13; a seat 23 further comprising: an opening 20; a receiving portion 200 configured to receive a gate, the gate configured to be selectively inserted into the receiving portion 200 intermediate the seat 23; at least one port 185 formed in the seat 23; a conical seat plate 24 nested concentrically against the seat 23 and between the seat 23 and the opening 20 wherein the seat plate 24 is configured to isolate at least one port 185 formed in the seat 23 from the opening 20 wherein the seat plate 24 if further configured to articulate independent of the seat 23; and a bias system 160 configured to bias the seat plate 24 against the seat 23 to isolate the seat 23 from the opening 20. In some embodiments the isolation valve 14 further comprises packing 180 placed at the interface 190 between the conical seat plate 24 and the seat 23 which packing member 180 deforms as it is compressed radially as the seat plate 24 is biased against the seat 23. In some embodiments the conical seat plate 24 comprises a shelf 195 with an angled surface which interface 190s with the seat 23 and is configured to radially compress the packing 180 as the bias system 160 is activated. In some embodiments the isolation valve 14 bias system 160 comprises a spring 165, a bellows 170 and a steam chamber 175 configured to cooperatively work to expand the steam chamber 175 and bias the seat plate 24 and seat 23 against the gate 11 when steam pressure is applied to the steam chamber 175.

Some embodiments teach a method of isolating a steam port 185 in an decoking valve from the valve opening 20 comprising: providing a gate having a first side 12 and a second side 13; providing a seat 23 comprising an opening 20; a receiving portion 200 configured to receive a gate, the gate configured to be selectively inserted into the receiving portion 200 intermediate the seat 23; at least one port 185 formed in the seat 23; a conical seat plate 24 nested concentrically against the seat 23 and between the seat 23 and the opening 20 wherein the seat plate 24 is configured to isolate at least one port 185 formed in the seat 23 from the opening 20 wherein the seat plate 24 if further configured to articulate independent of the seat 23; biasing the seat plate 24 against the seat 23 using a bias system 160; and compressing a packing member 180 placed at the interface 190 between the conical seat plate 24 and the seat 23 to substantially isolate the at least one port 185 from the opening 20.

In some embodiments the method further comprises providing an angled shelf 195 on the seat plate 24 which shelf 195 interface 190s with the seat 23 to radially compress the seat 23 as the seat plate 24 is biased against the seat 23. In some embodiments the method further comprises providing packing 180 at the shelf 195-seat 23 interface 190 wherein the packing 180 is configured to be compressed radially upon activation of a bias force against the seat plate 24.

In some embodiments the method further comprises selectively biasing the seat plate 24 against the seat 23 by pressurizing the steam chamber 175 with steam. In some embodiments the method further comprises isolating the valve body from process fluid with a seat plate 24 which extends beyond the seat 23 so that the seat plate 24 scrapes against the seat as the gate moves. Some embodiments perform the steps to the method in a different order, delay performing steps, or eliminate steps all together.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. An isolation valve configured to isolate a valve body from process fluid passing through the valve comprising:
 a seat configured to receive a gate, wherein the gate comprise a first side and a second side and is configured to be selective positioned intermediate the seat;
 a first port and a second port formed in the seat at an interface between the seat and the seat plate;
 a conical seat plate comprising an angled shelf which is configured to create a radial force into the seat when the seat plate is biased against the seat;
 a seat plate concentrically nested between the seat and a valve opening and configured to articulate independent of the seat, the seat plate comprising a sealing system which selectively seals the seat plate and the seat; and a bias system comprising a bellows and a steam chamber configured to axially expand when the chamber is filled with steam so as to bias the seat plate against the seat.

2. The isolation valve of claim 1 wherein the bias system further comprises at least two bias members which cooperatively bias the seat plate against the seat.

3. The isolation valve of claim 1 wherein the bias system further comprises a third bias member positioned on the second side of the gate configured to bias the seat plate against the seat in a direction of the gate configured to seal the seat plate and the seat against both the first side and the second side of the gate.

4. The isolation valve of claim 2 wherein the at least two bias members comprises a spring.

5. The isolation valve of claim 2 wherein the at least two bias members comprises a bellow.

6. The isolation valve of claim 2 wherein the at least two bias members comprises a steam chamber.

7. The isolation valve of claim 6 further comprising packing configured to improve a seal between the seat plate and the seat.

8. The isolation valve of claim 7 further comprising further comprising graphite packing placed therein configured to improve the seal between the seat and the seat plate.

9. The isolation valve of claim 1 wherein the seat plate is extended beyond the seat and is configured to maintain constant contact with the gate such that all process fluid is isolated from the seat and prevented from entering the valve body.

10. The isolation valve of claim 1, further comprising a gate port and wherein the seat plate further comprises an assembly shoulder bolt configured to set travel limits of the seat plate when valve is stroking to prevent over-travel into a gate port.

11. An isolation valve configured to isolate at least one port on a seat plate from a valve opening comprising:
   a gate having a first side and a second side;
   a seat further comprising:
      an opening;
      a receiving portion configured to receive the gate, the gate configured to be selectively inserted into the receiving portion intermediate the seat;
      at least one port formed in the seat;
      a conical seat plate nested concentrically against the seat and between the seat and the opening wherein the seat plate is configured to isolate at least one port formed in the seat from the opening wherein the seat plate is further configured to articulate independent of the seat; and
      a bias system comprising a bellows and a steam chamber configured to bias the seat plate against the seat to isolate the seat from the opening.

12. The isolation valve of claim 11 further comprising a packing member placed at an interface between the conical seat plate and the seat which packing member is compressed radially as the seat plate is biased against the seat.

13. The isolation valve of claim 11 further comprising packing wherein the conical seat plate comprises a shelf with an angled surface which interfaces with the seat and is configured to radially compress the packing as the bias system is activated.

14. The isolation valve system of claim 11 wherein the bias system comprises a spring, a bellows and a steam chamber configured to expand when steam pressure is applied to the steam chamber.

15. A method of isolating a steam port in a decoking valve from a valve opening comprising:
   providing a gate having a first side and a second side;
   providing a seat comprising an opening;
      a receiving portion configured to receive the gate, the gate configured to be selectively inserted into the receiving portion intermediate the seat;
      at least one port formed in the seat;
      a conical seat plate nested concentrically against the seat and between the seat and the opening wherein the seat plate is configured to isolate the at least one port formed in the seat from the opening wherein the seat plate if further configured to articulate independent of the seat;
   biasing the seat plate against the seat using a bias system; and
   compressing a packing member placed at the interface between a conical seat plate and the seat to substantially isolate the at least one port from the opening.

16. The method of claim 15 further comprising providing an angled shelf on the seat plate which shelf interfaces with the seat to radially compress the seat as the seat plate is biased against the seat.

17. The method of claim 15 wherein the interface further comprises providing packing at a shelf seat interface and is configured to be compressed radially upon activation of a bias force against the seat plate.

18. The method of claim 15 further comprising selectively biasing the seat plate against the seat by filling a steam chamber in the valve with steam.

19. The method of claim 15 further comprising isolating the valve body from process fluid with a seat gate which extends beyond the seat so that the seat gate scrapes against the seat as the gate recited in claim 16 moves.

* * * * *